(12) United States Patent
Peirsman et al.

(10) Patent No.: US 10,232,994 B2
(45) Date of Patent: Mar. 19, 2019

(54) RESILIENT CLOSURE FOR PRESSURE DRIVEN DISPENSING CONTAINER

(75) Inventors: Daniel Peirsman, Leuven (BE); Vanessa Valles, Leuven (BE)

(73) Assignee: Anheuser-Busch InBev S.A., Brussels (BE)

( * ) Notice: Subject to any disclaimer, the term of this patent is extended or adjusted under 35 U.S.C. 154(b) by 2 days.

(21) Appl. No.: 13/809,128

(22) PCT Filed: Jul. 4, 2011

(86) PCT No.: PCT/EP2011/061224
§ 371 (c)(1),
(2), (4) Date: Mar. 25, 2013

(87) PCT Pub. No.: WO2012/004223
PCT Pub. Date: Jan. 12, 2012

(65) Prior Publication Data
US 2013/0175304 A1    Jul. 11, 2013

(30) Foreign Application Priority Data

Jul. 8, 2010 (EP) .................................. 10168970

(51) Int. Cl.
*B67D 1/00* (2006.01)
*B65D 51/24* (2006.01)
(Continued)

(52) U.S. Cl.
CPC ......... *B65D 51/243* (2013.01); *B67D 1/0832* (2013.01); *B67D 1/0835* (2013.01); *F16K 15/147* (2013.01); *Y10T 29/49826* (2015.01)

(58) Field of Classification Search
CPC .. B67D 1/0462; B67D 1/0802; B67D 1/0829; B67D 2001/0828; B67D 1/0832; B67D 1/0835; F16K 15/147
(Continued)

(56) References Cited

U.S. PATENT DOCUMENTS 2,328,948 A * 9/1943 Bourke ................ B67D 1/0835
137/320
2,526,629 A * 10/1950 Bourke ................ B67D 1/0832
137/847
(Continued)

FOREIGN PATENT DOCUMENTS

EP    0 149 352    7/1985
EP    1 730 044    11/2005
(Continued)

*Primary Examiner* — Charles P Cheyney
(74) *Attorney, Agent, or Firm* — Levy & Grandinetti

(57) ABSTRACT

The invention is a closure for the aperture of a pressure driven dispensing container. The closure includes (a) an outer shell having a planar base including an outer first main surface and an inner second main surface. The base includes a dispensing aperture fluidly connecting the outer surface to the inner surface and receives a dispensing tube. An outer peripheral skirt juts out of the inner surface and seals the closure to the aperture of the container. The closure also includes (b) a flexible valve in contact with the inner surface located within the outer peripheral skirt and defining an interior passageway having a first opening at one end adjacent to and in fluid communication with the first dispensing aperture and having a second opening at the other end of the passageway, wherein the flexible valve is resiliently biased so that it naturally shuts and seals the second opening.

16 Claims, 4 Drawing Sheets

(51) Int. Cl.
*F16K 15/14* (2006.01)
*B67D 1/08* (2006.01)

(58) Field of Classification Search
USPC ......... 222/400.7, 494, 394, 321.9, 527, 546, 222/490, 386.5
See application file for complete search history.

(56) References Cited

U.S. PATENT DOCUMENTS

| | | | |
|---|---|---|---|
| 2,568,976 A | | 9/1951 | Andrews |
| 2,576,192 A | * | 11/1951 | Poznik ............. B60K 15/03519 137/526 |
| 2,830,611 A | * | 4/1958 | Stelma ................. B67D 1/0832 137/322 |
| 3,170,607 A | * | 2/1965 | Anthon .................. B65D 45/02 215/273 |
| 3,270,920 A | * | 9/1966 | Nessler ........................... 222/95 |
| 3,372,838 A | | 3/1968 | Smith et al. |
| 3,374,927 A | * | 3/1968 | Schmidt .................... B67B 7/26 222/400.7 |
| 3,637,117 A | * | 1/1972 | Johnston .............. B67D 1/0802 222/400.7 |
| 3,906,989 A | * | 9/1975 | Lamb .................. B67D 1/0832 137/320 |
| 4,000,829 A | * | 1/1977 | Johnson et al. .............. 220/265 |
| 4,134,512 A | * | 1/1979 | Nugent ......................... 215/247 |
| 4,700,861 A | * | 10/1987 | Neward ........................ 215/309 |
| 4,784,299 A | * | 11/1988 | Stenger ........................ 222/397 |
| 4,808,381 A | * | 2/1989 | McGregor ............ A61J 1/1406 215/307 |
| 4,954,149 A | * | 9/1990 | Fullemann ...................... 96/105 |
| 5,199,609 A | | 4/1993 | Ash, Jr. |
| 5,202,093 A | * | 4/1993 | Cloyd ........................... 422/547 |
| 5,240,144 A | | 8/1993 | Feldman |
| 5,251,787 A | | 10/1993 | Simson |
| 5,285,931 A | * | 2/1994 | Alfons ................. B65D 83/663 137/903 |
| 5,297,599 A | * | 3/1994 | Bucheli ........................ 141/329 |
| 5,383,576 A | | 1/1995 | Richter et al. |
| 5,456,284 A | | 10/1995 | Ryan et al. |
| 6,045,004 A | | 4/2000 | Elliott |
| 6,769,577 B1 | | 8/2004 | Feierabend |
| 7,033,339 B1 | * | 4/2006 | Lynn ..................... A61M 39/02 604/246 |
| 7,695,577 B2 | | 4/2010 | Shioda et al. |
| 8,317,049 B2 | | 11/2012 | Piotrowski et al. |
| 8,887,959 B2 | * | 11/2014 | Hill et al. .................... 222/131 |
| 2007/0289991 A1 | | 12/2007 | Jensen |
| 2010/0112815 A1 | * | 5/2010 | O'Dougherty ....... B67D 7/0261 438/689 |

FOREIGN PATENT DOCUMENTS

| | | |
|---|---|---|
| EP | 1 763 475 | 2/2006 |
| EP | 1 683 755 | 7/2006 |
| EP | 1 858 770 | 9/2006 |
| EP | 1 958 883 A1 | 8/2008 |
| GB | 1021266 | 3/1966 |
| GB | 1 163 761 | 9/1969 |
| GB | 1 427 732 | 3/1976 |
| WO | WO 00/03944 | 1/2000 |
| WO | WO 2006/128653 | 12/2006 |
| WO | WO 2007/145641 | 12/2007 |
| WO | WO 2008/060152 | 5/2008 |
| WO | WO 2009/020425 | 2/2009 |
| WO | WO 2009/050713 | 4/2009 |
| WO | WO 2009/090223 | 7/2009 |
| WO | WO 2009/090224 | 7/2009 |
| WO | WO 2009/090225 | 7/2009 |
| WO | WO 2010/031764 | 3/2010 |

\* cited by examiner

RESILIENT CLOSURE FOR PRESSURE DRIVEN DISPENSING CONTAINER

This Application is the U.S. National Phase of International Application Number PCT/EP2011/061224 filed on Jul. 4, 2011, which claim priority to European Application Number 10168970.1 filed on Jul. 8, 2010.

FIELD OF THE INVENTION

The present invention relates to the field of dispensing devices for liquids, in particular of pressure driven beverage dispensing apparatuses. In particular, it concerns a closure allowing the protection of the liquid contained in a container from ambient air upon successive insertions and retrievals of the container from a dispensing unit.

BACKGROUND OF THE INVENTION

Liquid dispensing devices have been on the market for ages. In particular, pressure driven dispensing devices rely on a pressurized gas raising the pressure to a level of about 0.1 to 15 bar, usually of 0.5 to 1.5 bar above atmospheric in the interior of a container containing the liquid to be dispensed, such as a beverage like beer or other carbonized beverages. Since the liquid contained in the container is at a higher pressure than atmospheric, it will flow out of the container through a dispensing tube upon fluidly connecting it with ambient. For dispensing a liquid, the interior of the container must therefore first be fluidly connected to, on the one hand, a source of pressurized gas to raise the pressure in the container and, on the other hand, to the ambient through a dispensing tube comprising a valve for dispensing the liquid. These connections usually run through a specially designed closure of the container. For aesthetic reasons and to ease the connections required for the use of such dispensing containers, the latter are usually mounted into a dispensing appliance which allows the various fluid connections to be put in place rapidly and easily. In optimal appliances, this operation is completed by simply clicking into place the top chime (or hood) of the appliance onto the container's closure.

The gas is either fed directly into the container containing the liquid like e.g., in U.S. Pat. No. 5,199,609 or between an external, rather stiff container and an inner, flexible vessel (e.g., a bag or a flexible bottle) containing the liquid to be dispensed, like in U.S. Pat. No. 5,240,144 (cf. appended FIG. 1(a)&(b)); the latter system is called "dispensing bag-in-container." Both applications have their pros and cons which are well known to the persons skilled in the art. The present invention applies to both types of delivery systems, but is particularly advantageous for dispensing bag-in-containers-or simply "bag-in-container"—which meaning is herein restricted to dispensing containers wherein the dispensing of the liquid is driven by a pressure difference across the inner bag wall, preferably by injection of a pressurized gas into the space between inner bag and outer container.

The compressed gas may be provided by a compressor, included in a specific appliance (cf. U.S. Pat. No. 5,251,787), or contained in a compressed gas bottle (cf. U.S. Pat. No. 5,383,576, FIG. 7). Alternatively, the container may be pre-pressurized, with enough pressure to dispense part or the whole content of the container (cf. WO2010/031764). This solution is advantageous as it does not require the connection of the container to an external source of pressurized gas. It has, however, the drawback that the outer container must be sufficiently robust to resist deformation under the relatively high pressure required for the dispensing. It is possible to limit or even eliminate the level of pre-pressurisation of the container, by storing a sufficient amount of gas either in a small cartridge or adsorbed on a carrier, which are placed in the container and designed to release gas when required as disclosed in WO2008060152.

More recently, a market for home appliances of smaller size of the order of 0.25 to 12 liters, typically of 2 to 5 liters has been developing rapidly. For technical and economic reasons, it is sometimes preferable to use no compressor or large compressed gas bottle and the propellant gas can then be stored in a rather small pressurized cartridge closed by a cap or a membrane. The cap or membrane of these home dispensers may be pierced open in plant but, to avoid risks of leakage, it is usually preferred that the piercing of the closure be performed by the end-user prior to using the device for the first time. Examples of such devices can be found in EP149352, WO2007/145641, GB1427732, GB1163761, U.S. Pat. No. 3,372,838, and WO2006/128653, and are illustrated in attached FIG. 1.

The propellant gas stored in a bottle or cartridge is at a pressure much higher than the 0.5 to 1.5 bar above atmospheric required in the container to drive the dispensing of the beverage. It is therefore necessary to interpose between the gas bottle or cartridge and the container a pressure regulating valve for reducing the pressure of a propellant gas stored in a bottle or cartridge at a first, high pressure to a second, lower pressure suitable for driving the dispensing of the beverage. Upon use, the gas is fluidly connected to the container at a controlled pressure through a duct running through the closure and opening either in the space containing the liquid (cf. FIG. 1(a)) or in the space between the inner bag and outer container of a bag-in-container (cf. FIG. 1(b)). The solutions discussed above of storing the pressurizing gas in the container either in a small cartridge or adsorbed on a carrier are particularly suitable for smaller home appliances, but to date they are not quite so widespread yet. When implemented, however, no external connection is required and the closure needs not comprise an opening for receiving a pressurized gas tube.

The liquid contained in the container can be dispensed by pressure driving its flow in a dispensing tube fluidly connecting the interior of the container with the ambient. Like the gas duct fluidly connecting the source of pressurized gas with the container, the dispensing tube usually runs through an aperture in the closure of the container and opens in the volume containing the liquid, regardless of whether a bag-in-container or a "traditional" pressure driven container is used. Since the pressure in the container is usually constantly maintained above atmospheric the dispensing tube normally comprises a valve in order to control the dispensing of liquid. In case the pressurized gas is injected in contact with the liquid to be dispensed (cf. FIG. 1(a)) the dispensing tube must extend deep down into the container, since the liquid at a level below the opening of the dispensing tube may not be dispensed if the container is maintained in its upright position (as is usually the case). This is not mandatory in case of bag-in-containers (cf. FIG. 1(b)), since the collapse of the inner bag ensures that at all time the liquid is in contact with the closure. In some cases, however, it is desirable to have the dispensing tube penetrate into the bag to better control the collapse of the bag. But this solution has the disadvantage of having to introduce a long stem deep into the container, which operation may be cumbersome, and it is usually preferred—if possible—to control the collapse of the inner bag by other means.

WO2009090223, WO2009090224, and WO2009090225 disclose closures for pressure driven dispensing containers comprising a first aperture for receiving a dispensing tube and a second aperture for receiving the gas duct by simply click fitting the container into a dispensing appliance. The closures disclosed in said applications are particularly suitable for bag-in-containers WO2009090223 discloses a closure having a base comprising a pierceable part, the pierceable part being defined by a sidewall extending transversally with respect to the base and a bottom thereby creating a indent therein, said sidewall and/or bottom comprising several lines of weakened material strength, characterized in that said lines divide the sidewall and/or bottom in several wedge, but they can be used for normal pressurized containers by simply positioning the aperture for the gas duct to open into the space containing the liquid. In particular, formed parts. Said opening is pierced open upon introduction of the dispensing tube therethrough when the container is click fitted into a dispensing appliance. The problem with the closure described therein is that if the container is retrieved from the appliance before it is empty, e.g., for mounting a new container with a different beverage or for cleaning the appliance, the liquid remaining in the container cannot be protected from contact with the ambient during storage, as the dispensing aperture of the container's closure is irreversibly open. This may result in the degradation of the liquid still present in the container, in particular if it is a carbonated beverage such as a beer or a soda. Furthermore, spillage of any liquid remaining in the container in case it is tilted cannot be prevented with the present closures.

There are several resilient closures for liquid containers described in the art, which open upon dispensing and close back when not in use. Generally, these closures comprise a portion made of a resilient material with one or several slits which are naturally closed. The slits open upon application of a pressure inside the container, for example by turning the container up side down, or by pressing the flexible walls of a container, and resiliently close back when the pressure is reduced. The slitted resilient portion often has a concave shape to accentuate the spring back effect. Examples of such closures are described in EP1858770, U.S. Pat. Nos. 6,769, 577, 6,045,004, EP1763475, US2007138189, EP1730044. These closures, however, are not suitable to operate at the pressures used in pressure dispensing containers, and in particular in case of carbonated beverages, the liquid is to be stored in the half empty container under pressure, which would unevitably open such closures.

The present invention concerns closures for "pressure driven dispensing containers," which term refers here to containers which dispensing of the liquid contained therein is driven by a pressurized gas raising the pressure inside the container above atmospheric. Dispensing of the liquid out of a pressure driven dispensing container therefore does not require the tilting of the container to bring the mouth thereof at a level lower than the level of the liquid, nor the squeezing of the external walls of the container, e.g., by hand. The pressurized gas may be stored within the container prior to use or be introduced into the container from an external source.

Valves for pressure driven dispensing containers are disclosed e.g., in WO00/03944 and EP1683755. But these valve designs are rather complex with moving parts, their production requiring cost and time extensive assembly steps, not compatible with rather disposable containers to be mounted on home appliances of rather modest size. For such applications, characterized by a rather unfavourable cost ratio between the liquid (beverage) and the container compared with systems of larger size, it is preferable to reduce the cost of the valve and therefore to develop a design comprising no moving part and, possibly requiring no assembly step.

There are closures on the market which may be pierced opened by a dispensing duct and resiliently and sealingly closing back upon withdrawal of the duct. For instance, vials closed with a rubber or foam closure may be pierced open by introducing a syringe needle and sealingly and resiliently closes back as the needle is retrieved. But the dispensing tube diameter required to ensure an acceptable flow rate of the order of 0.5 to 2.5 l/min, or even up to 5 l/min, typical of beverage dispensing containers does not allow to upscale the vial solution to pressure driven dispensing liquid containers.

WO2009/050713 discloses a one way valve for inflatable articles, wherein a lid in the valve is pushed open by the introduction of the tube of an inflating pump, said lid being mounted on resilient means such as to spring back into its closed position as the pump tube is withdrawn. This solution is not suitable for the closure of pressure driven dispensing container because (a) it comprises multiple components to be assembled which is not compatible with the cost requirement of a beverage dispensing system, and (b) the pushed open lid remains in contact with the opening of the pump tube, which is no problem when the fluid flow pushes the lid away from the tube as is the case with a pump, but is unsuitable when the liquid flow pushes the lid back against the tube as is the case with a dispensing container, thus partially obturating the dispensing pipe inlet and disrupting the liquid flow out of the container.

U.S. Pat. No. 2,568,976 discloses a flexible valve for inflatable articles wherein a flexible membrane is resiliently pressed by a spring against a section of the inflatable article wall comprising an opening. This valve is designed for use with inflatable products having no rigid wall and is not suitable for use with closures for dispensing containers.

WO2009/020425 discloses a non return valve to be fastened together inside a container for air or liquids such as mattresses, cushions, etc. The non-return valve is formed of two sheets made of a non-rigid plastic or rubber material, welded together to form an through channel. The valve further comprises a resilient device spanning the through channel, said resilient device being fixed on two opposite sides of said through channel, and being biased such as to stretch the sheets and thus close tight the through channel. Here again, the valve disclosed therein is not suitable for the closure of a dispensing container because rather large in dimensions, and requiring welding and assembly of multiple components, which is not consistent with the economics of beverage dispensing containers.

There therefore remains a need for a closure of a pressure driven liquid dispensing container allowing the easy and swift mounting thereof into a dispensing appliance. The closure should allow the automatic and fluid tight sealing of the dispensing aperture upon retrieval of the container from the appliance. The present invention proposes such closure which may be produced rapidly and economically, preferably without any assembly step.

SUMMARY OF THE INVENTION

The present invention is defined in the appended independent claims. Preferred embodiments are defined in the dependent claims. In particular, the present invention provides a closure for closing the aperture of a pressure driven dispensing container, said closure comprising:

(a) an outer shell comprising:
a substantially planar base comprising a first outer main surface and a second inner main surface separated from the outer surface by the thickness of the base, said base further comprising a first dispensing aperture fluidly connecting the outer surface to the inner surface and suitable for receiving a dispensing tube;
an outer peripheral skirt jutting out of the periphery of the inner surface and suitable for sealingly fixing the closure to the aperture of said pressure driven dispensing container; and
(b) a flexible valve in contact with the inner surface, located within the outer peripheral skirt, and defining an interior passageway having a first opening at one end adjacent to and in fluid communication with the first dispensing aperture and having a second opening at the other end of the passageway, wherein, the flexible valve is resiliently biased such as to naturally shut and seal the second opening, and such that said sealed second opening is reversibly openable by pressing the tip of a hollow dispensing tube through the first aperture down said interior passageway, and out of said second opening.

In a preferred embodiment, the valve second opening comprises one or more pair of lips, which are naturally pressed one against the other by said resilient bias, and which can be reversibly separated from one another by introduction therebetween of the tip of the dispensing tube. It is particularly advantageous if each pair of lips comprise a slit at the joining points of the lips. The interior passageway defined by the valve is preferably funnel shaped, opening on the lips at the narrow end of the funnel.

The resilient bias of the flexible valve is preferably obtained by one, or a combination of:
(a) external resilient means arranged such as to apply a compressive force to press shut and seal the second opening, said resilient means being preferably selected from one or more of the following:
a foam,
an elastomeric material, preferably rubber or flexible thermoplastic elastomers (TPE); silicon;
spring blades, and/or
(b) the materials and/or design of the flexible valve itself.

The resilient means defined in (a) may advantageously comprise a thermal and/or electrical conductor. The lips of the valve may be made of the same cellular material as the resilient means, but with a higher density. Alternatively, different material may be used for the lips of the valve and the resilient means.

For pressure driven dispensing containers requiring an external source of pressurized gas, the closure may comprise a second gas aperture fluidly connecting the outer surface to the inner surface and suitable for receiving a hollow pressurized gas tube. In a preferred embodiment, said second, pressurized gas aperture comprises closing means that can be opened by pressing therethrough the tip of a hollow pressurized gas tube, preferably resiliently and sealingly closing back as the tip of the pressurized gas tube is retrieved.

The closure of the present invention may comprise no moving part, which makes it simple and cheaper to produce.

The present invention also concerns a pressure driven dispensing container, preferably a bag-in-container, comprising a closure as defined above.

Finally, the present invention also concerns processes for producing a closure for closing the aperture of a pressure driven dispensing container. A first process comprises the following steps:

(a) Injection moulding a first polymer to form a closure shell having:
a substantially planar base, said base comprising a first outer main surface and a second inner main surface separated from the outer surface by the thickness of the base, said base further comprising a first dispensing aperture fluidly connecting the outer surface to the inner surface (110in) and suitable for receiving a dispensing tube; and
an outer peripheral skirt jutting out of the periphery of the inner surface and suitable for sealingly fixing the closure to the aperture of said pressure driven dispensing container;
(b) positioning or injection moulding onto the inner surface of the base and within the peripheral skirt a flexible valve (9) defining an interior passageway having a first opening at one end adjacent to and in fluid communication with the first dispensing aperture and having a second opening at the other end of the passageway, and
(c) optionally positioning or injection moulding onto the inner surface of the base and within the peripheral skirt in contact with the flexible valve a flexible resilient material to form resilient means arranged and biased such as to naturally apply a compressive force to press shut and seal the valve second opening, said compressive force being suitable to be overcome to reversibly open the valve by pressing the tip of a hollow dispensing tube through the first aperture down said interior passageway, and out of said second opening,
wherein, the flexible valve is resiliently biased such as to naturally shut and seal the second opening, and such that said sealed second opening is reversibly openable by pressing the tip of a hollow dispensing tube through the first aperture down said interior passageway, and out of said second opening.

The second process is restricted to the use of foams or cellular materials for the resilient means. It comprises the same step (a) as for the first process, followed by
(b) injection moulding onto the inner surface of the base and within the peripheral skirt a flexible resilient cellular material to form:
a flexible valve defining an interior passageway having a first opening at one end adjacent to and in fluid communication with the first dispensing aperture and having a second opening at the other end of the passageway, and
resilient means arranged and biased such as to naturally press shut and seal the second opening with a compressive force which can be overcome to reversibly open the valve by pressing the tip (1a) of a hollow dispensing tube (1) through the first aperture down said interior passageway (210), and out of said second opening;
wherein the cellular foam forming the flexible valve has a higher density than the one forming the resilient means.

The present invention is described in more details in the next sections, in combination with the following figures.

DETAILED DESCRIPTION OF THE INVENTION

Figure 1:
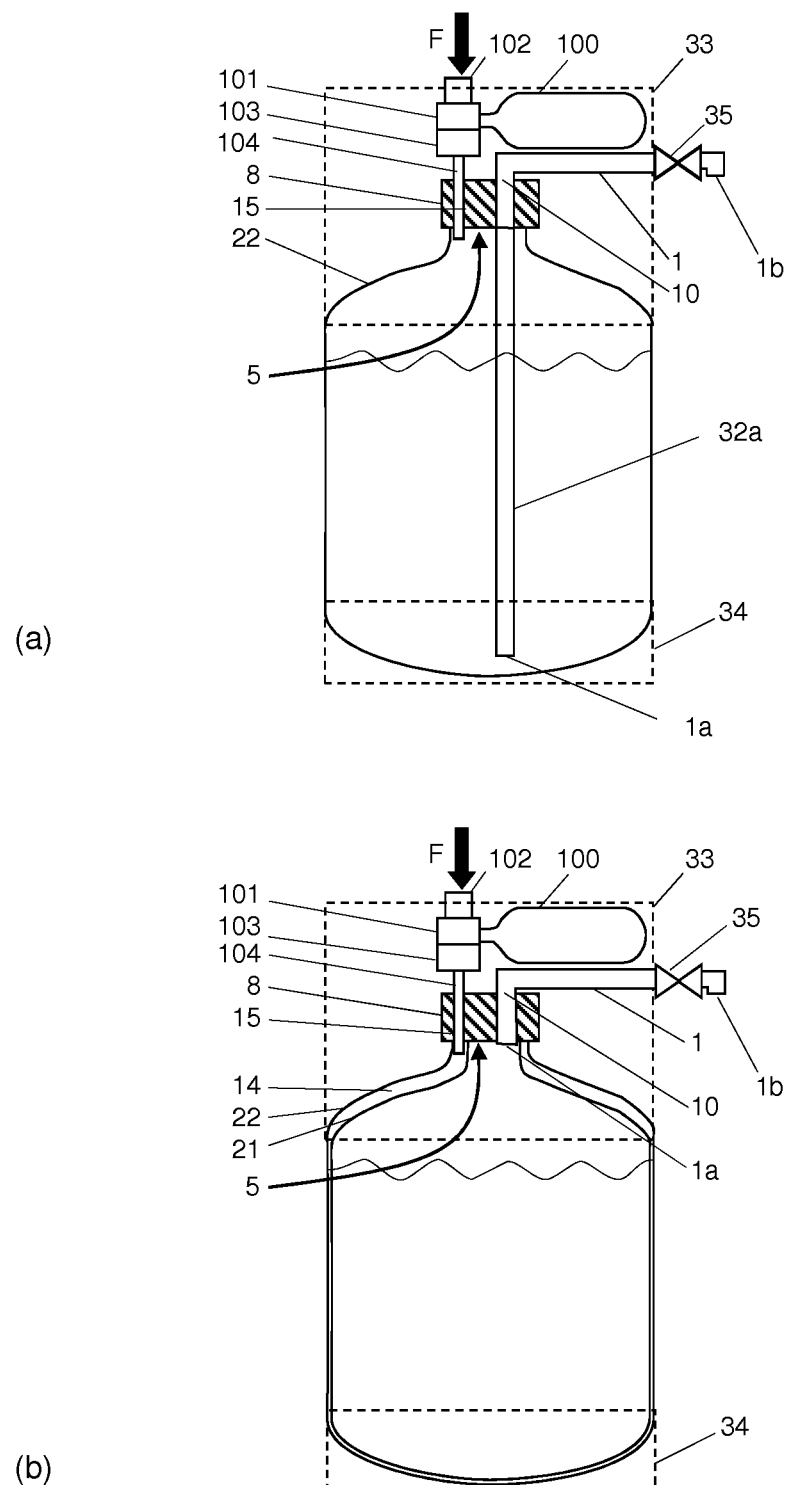
FIG. 1: shows two embodiments of a pressurized beverage dispenser according to the present invention.

FIG. 1 shows two alternative embodiments of pressure driven liquid dispensing devices according to the present invention. The invention is not limited to the types of appliances depicted in FIG. 1, and can, on the contrary, be applied to any type of beverage gas driven dispensing container. In both embodiments of FIG. 1, the dispensing of a liquid, generally a beverage like a beer or a carbonated soft drink, is driven by a pressurized gas contained e.g., in a gas cartridge (100). A small cartridge is depicted in FIG. 1, but the source of pressurized gas may of course be a large gas bottle or replaced by a compressor. Upon piercing of the closure of the pressurized gas cartridge (100) by actuation by an actuator (102) of a piercing unit (101), the gas contained in the cartridge (100) is brought into fluid communication with the container (21, 22) at a reduced pressure (but higher than atmospheric) via the pressure regulating valve (103). In FIG. 1(a) the gas is introduced through the gas duct (104) directly into the container (22) and brought into contact with the liquid contained therein, whilst in the embodiment of FIG. 1(b), depicting a bag-in-container, the gas is injected at the interface (14) between an outer, rather rigid container (22) and a flexible inner container or bag (21) confining the liquid. In this latter embodiment, the gas never contacts the liquid to be dispensed.

In both embodiments, the pressure in the vessel (21, 22) is brought to a level of the order of 0.5 to 1.5 bar above atmospheric (i.e., 1.5 to 2.5 bar) which forces the liquid through the channel opening (1a), which flows along the dispensing tube (1) to reach the tap (35) and eventually the dispensing outlet (1b). In some cases, it is advantageous or even necessary that the opening (1a) be located at one end of a drawing stem (32a) extending from the dispensing tube (1) into the interior of the container (21, 22) below the level of the liquid. In the case of bag-in-containers as illustrated in FIG. 1(b), the use of a drawing stem (32a) is not mandatory since the inner bag (21) collapses upon pressurization of the volume (14) comprised between the inner bag (21) and the outer container (22), thus allowing the beverage to contact the channel opening (1a) without necessarily requiring a drawing stem (32a). On the other hand, a drawing stem (32a) is necessary when the pressurized gas contacts the liquid as in FIG. 1(a). In order to control the pressure and rate of the flowing liquid reaching the open tap at atmospheric pressure, a pressure reducing channel is sometimes interposed between the container (21, 22) and the tap (35) (not represented in FIG. 1).

The pressure driven container is usually mounted onto a dispensing appliance (33, 34) schematically represented in FIG. 1 by dotted lines, which generally comprises chilling means (34), a dispensing tube (1), and a connection (104) to a source of pressurized gas (100), such as a cartridge, a bottle or a compressor. For the users convenience, the connections of the container to the dispensing tube (1) and to the source of pressurized gas (100) should be as simple and swift as possible, generally simply requiring to click down the top section (33) of the appliance into position on a closure (8) of the container, said closure comprising a first dispensing aperture (10) and a second gas aperture (15) at positions matching the positions of the dispensing tube (1) and the gas connecting tube (104). Of course, in case of pre-pressurized containers or of pressurizing gas stored inside the container as disclosed in WO2008060152, no gas duct (104) an no corresponding second gas aperture (15) is required. WO2009090223, WO2009090224, and WO2009090225 disclose closures suitable for a simple and swift engagement of the dispensing tube (1) and gas connection tube (104) through the first and second apertures (10, 15) thereof. The closures disclosed in said documents, however, do not allow to disengage the container from the appliance and the corresponding dispensing and gas connection tubes (1, 104) and to protect from ambient the liquid still contained in the container. This of course has damaging consequences for most liquids in prolonged contact with air, and is unacceptable for carbonated beverages like beers and sodas. Indeed the dispensing aperture of the closures described therein is irreversibly pierced opened upon insertion of the tip of the dispensing tube, and remains open upon withdrawal of the dispensing tube. Spilling of any liquid still remaining in the withdrawn container cannot be avoided with an unsealed closure.

To solve this problem, the present invention proposes a solution compatible with the tight productivity and cost constraints imposed by the market. Like the closures disclosed in WO2009090223, WO2009090224, and WO2009090225, the closure of the present invention comprises an outer shell comprising a substantially planar base (110) defined by an inner surface (110in) designed to face the inside of the container when in place, and an outer surface (110out) designed to face out of the container. The base (110) is surrounded by an outer peripheral skirt (111) extending substantially normal to the base (110). The base (110) comprises a first dispensing aperture (10) suitable for fluidly connecting to the atmosphere the inner space (21, 22) of the container confining the liquid. In case an outer source of pressurized gas (100) is to be connected to the container, the base (110) may further comprise a second gas aperture (15) suitable for receiving a gas tube (104) to fluidly connect the interior of the container to said source of pressurized gas (100). The peripheral skirt (111) defines an inner space of the closure (8) and is suitable for sealingly fixing the closure (8) to the aperture (5) of said pressure driven dispensing container. The closure shell can be made of polyolefin, such as various grades of PE, PP, polyesters, such as PET or PEN. For reasons of cost, mechanical properties, and recyclability, however, it is preferably made of PE or PP.

The closure (8) of the present invention distinguishes itself from the closures of the prior art in its flexible valve (9) which can be opened by introduction therethrough of the tip of a dispensing tube (1) and which is resiliently biased such as to sealingly shut back the valve (9) upon retrieval of said dispensing tube (1) from the dispensing aperture (10). The flexible valve (9) defines an interior passageway (210) comprising a first opening at one end thereof in contact with the inner surface (110in) adjacent to and in communication with the first dispensing aperture (10) of the closure and at the other end thereof a second opening (10a). The valve second opening (10a) is held tightly closed by the compression naturally applied by the bias. By introducing the tip (1a) of a dispensing tube (1) through the dispensing aperture (10), along the valve internal passageway (210) the second opening (10a) is forced open against the resilient bias. Upon retrieval of the dispensing tube (1) from the internal passageway of the valve, the resilient bias drives the shuting and sealing of the second opening (10a).

Figure 2:
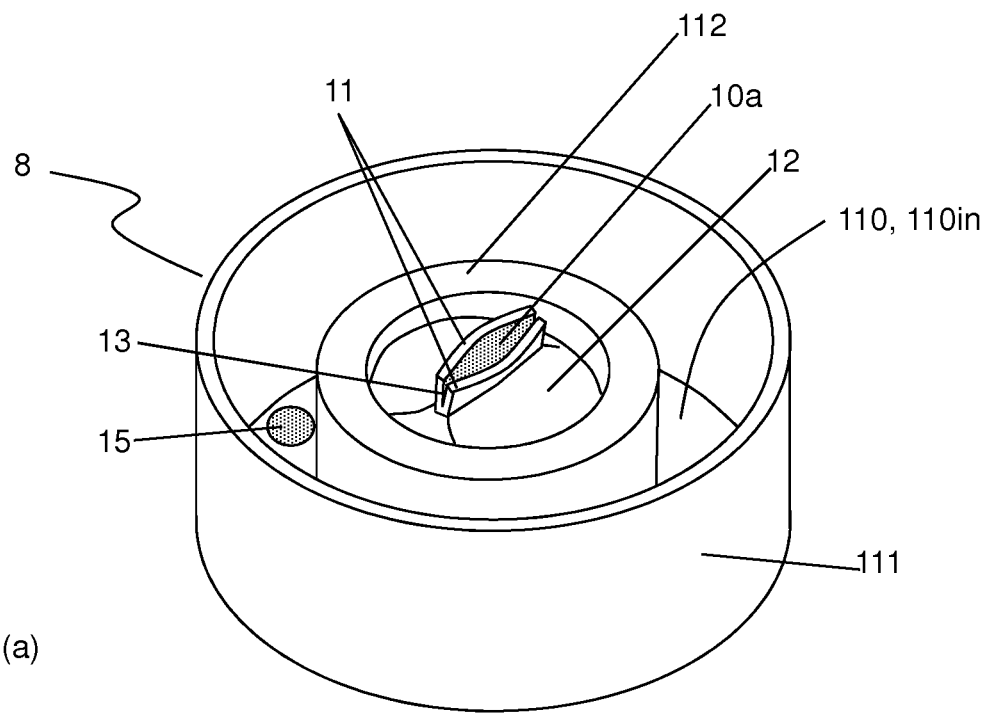
FIG. 2: shows two views of a closure according to the present invention: (a) "inside" of the closure, and (b) outer shell.
Figure 2:
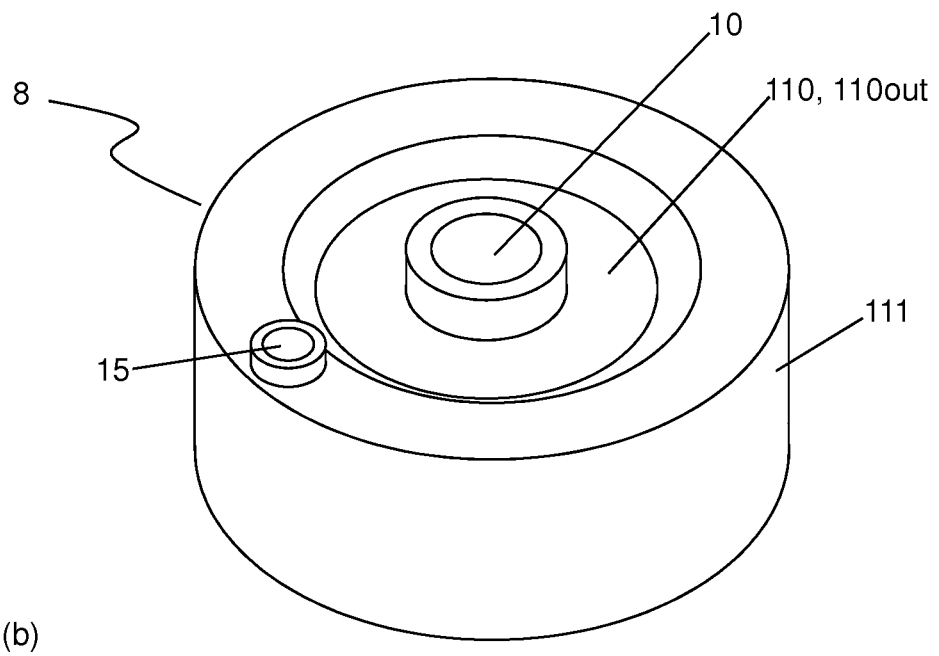
Figure 3:
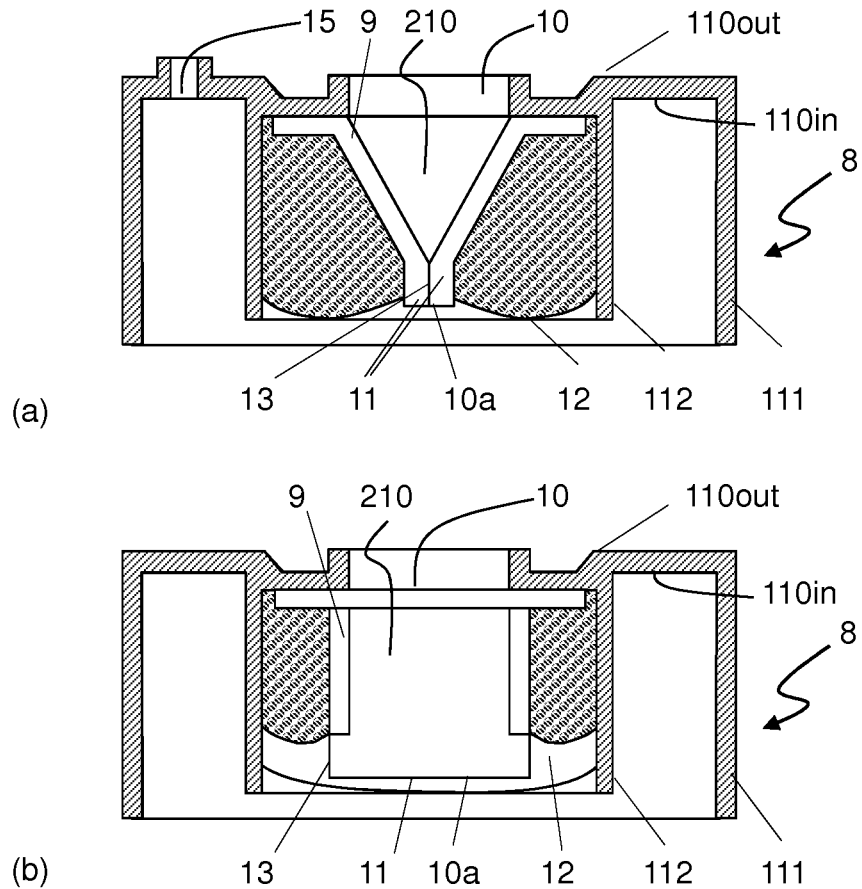
FIG. 3: shows two perpendicular side sections of a closure according to the present invention.

As illustrated in FIG. 3, the internal passageway (210) preferably has a wedge shape, or a conical shape, or any such geometry generally described herein as "funnel shaped", with the first opening on the wide end of said funnel being of size matching the size of the closure's first aperture (10), and the valve second opening (10a) on the opposite, narrow end. This geometry allows an easier insertion of the tip (1a) of the dispensing tube (1) and a more progressive and smoother application of a force countering the closing force of the bias to open the second opening (10a). The second opening (10a) preferably comprises one or more pairs of lips (11) facing each other. In the embodiment illustrated in FIGS. 2 to 4, one pair of lips is illustrated as preferred embodiment. But alternative designs can be used, such as lips disposed in the shape of a star with three, four, or more branches. In the embodiment illustrated in FIGS. 2 and 3, resilient means (12) consist of a foam pressing tightly two lips (11) one against the other to seal the opening (10a). To eliminate the high curvature points at both joining points of the lips (11), a slit (13) substantially normal to the direction of the compressive forces may be applied there, thus yielding an enhanced tightness for a constant pressure (cf. FIG. 4). Slits at the joining points of two lips can be applied also in case the valve comprises more than one pair of lips.

The resilient bias naturally shutting and sealing the valve passage can be obtained by providing external resilient means (12) applying a compressive force against the walls of the second aperture (10a) to shut the valve (9), and/or by a proper selection of the material and design of the valve, such as to yield a valve having an "intrinsic" bias. External resilient means (12) may be one or a combination of a cellular material (a foam), an elastomeric material such as rubber (natural or synthetic), silicone, or flexible thermoplastic elastomer (TPE), or a spring, in particular a pair of opposing blade springs.

To eliminate all assembly steps for the production of the present closure (8), it is preferred that the resilient means (12) is a cellular material or an elastomeric material that may be injection moulded onto the inner surface (110in) of the closure base (110). Most preferred is the use of a foam. In particular, the resilient means may consist of an expanded polymer such as Santoprene TPV 271-55, a combination of PP+EPDM+Oil, with a foaming agent such as Hydrocerol. The use of a foam is particularly preferred because the cellular structure thereof permits to save considerable amounts of polymeric material, which has an impact on the production cost of the closure (8). Furthermore, cellular structures allow a good control of the magnitude of the compressive forces applied to the valve second opening (10a).

The resilient force in a compressed foam allowing it to spring back to its initial geometry upon release of a stress is provided, on the one hand, partly by the elastic properties of the strained cell walls and, on the other hand, also by the gas contained it the closed cells which is compressed by the strain. If the foam is compressed for a long time, however, the compressed gas present in the cells may diffuse through the cells walls to level out the pressures in and out of the cellular material, and may thus seriously lower the spring back capacity of the foam to press shut the valve's second opening (10a) after retrieval of the dispensing tube (1). To solve this problem, it may be advantageous to add to the cellular material thermally and/or electrically conductive additives, such as graphite, carbon black, or any dispersable conductor. These additives can be useful in two ways or in combination as follows. First, the resilient means may be cooled when the valve is open, in order to reduce the gas pressure in the foam cells and thus reduce the driving force for gas diffusion out of the cells. Second, the cellular material may be heated prior to dislodging the container from the dispensing appliance, in order to raise the gas pressure in the cells and thus apply a higher compressive force onto the valve's second opening (10a) once the dispensing tube has been retrieved. In both cases, the thermally and/or electrically conductive additive will enhance the thermal effect sought as foams are usually poor thermal conductors.

It may be advantageous to design the external resilient means (12) and/or the intrinsically resilient valve (9) such that the bias applied to the valve second opening (10a) is asymmetrical. Indeed, if the bias applied to one side of the valve is locally higher than the one applied to the other side of the valve, the free end will bend over towards the other end and thus further restricts the passageway; hence enhancing the tightness of the valve.

In order to stabilize the resilient means (12), an inner skirt (112) jutting out of the inner surface (110in), circumscribed within the outer skirt (111) and enclosing the dispensing aperture (10) and valve (9) may be advantageous. Such inner skirt (112) is particularly advantageous for closures of a bag-in-container as it permits to physically isolate the dispensing aperture (10) from the gas aperture (15), located on either side of said inner skirt (112). For such applications, the closure must comprise sealing means (not shown in the Figures) to seal, on the one hand, the interior of the container (21, 22) from the atmosphere and, on the other hand, the dispensing aperture (10) from the gas aperture (15). Examples of such sealing means are described e.g., in WO2009090224, which content is herein incorporated by reference.

In a preferred embodiment a membrane seals the first dispensing aperture (10), said membrane being easily breakable by pressing thereto the tip (1a) of a dispensing tube (1). Typically, a membrane as disclosed in WO2009090223, which teaching is incorporated herein by reference, wherein the membrane is pierceable and comprises a sidewall extending transversally with respect to the base and a bottom thereby creating a indent therein, said sidewall and/or bottom comprising several lines of weakened material strength, characterized in that said lines divide the sidewall and/or bottom in several wedge formed parts. The advantage of such embodiment is two folds. First, it ensures perfect sealing of the first aperture (10) before use, as such container may be stored for long periods of time before it is first used by an end user. Second, upon piercing said membrane by introduction theretrhough of the tip of a dispensing tube (1), the wedge formed parts will interpose themseleves between said tip and the walls of the passageway (210) in the valve (9), thus protecting the valve inner walls from damage by rubbing. It is preferred that the membrane be formed together with the closure outer shell and thus be made of the same material, such as PP.

For containers using an external source of pressurized gas (100), the closure (8) may comprise a second, gas aperture (15) connecting fluidly the inner and outer surfaces (110in and 110out) of the closure base (110). Closures for pressure driven dispensers wherein the pressurized gas contacts the liquid to be dispensed as illustrated in FIG. 1(a) require a resilient valve system for the second gas aperture (15) too, since both dispensing and gas apertures (10, 15) are in fluid communication with the liquid, and sealing the dispensing aperture (10) without sealing the gas aperture (15) would be useless. In case of bag-in-containers as illustrated in FIG.

1(b) sealing the gas aperture (15) upon removal of the container from the appliance is not mandatory, since the gas aperture (15) does not communicate with the liquid. It may, however, be advantageous, in particular for carbonated beverages, to provide the second gas aperture (15) with a resilient valve system, because the pressure difference across the inner bag wall (21) may drive the diffusion of carbon dioxide of the beverage across the thin wall of the inner bag (21).

Figure 5:
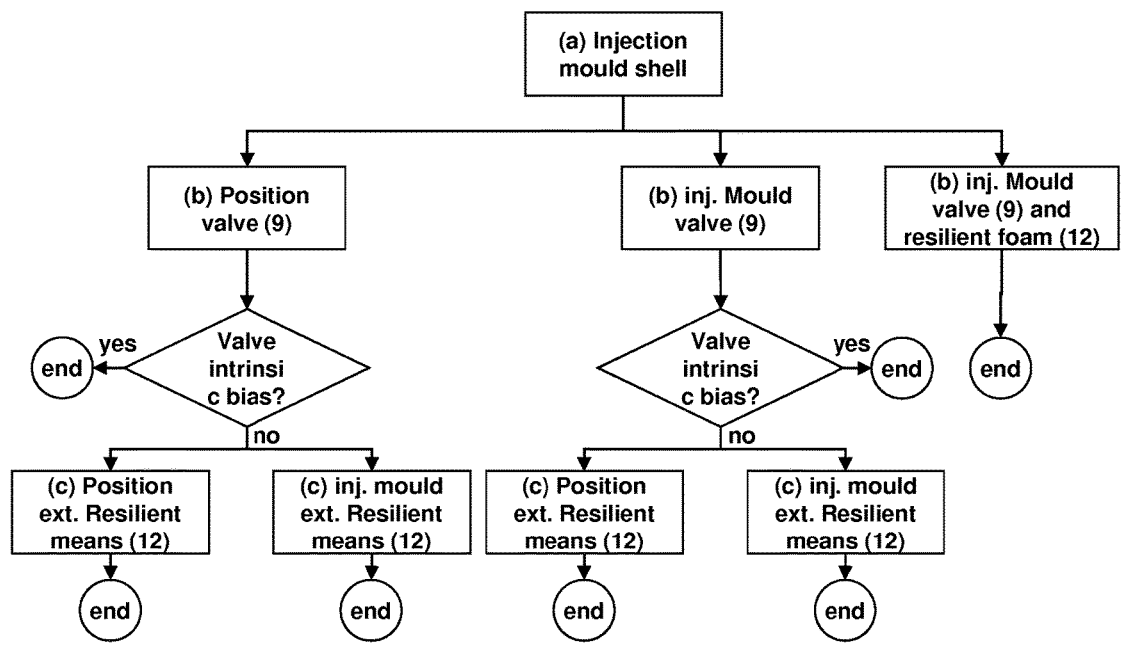
FIG. 5: shows a chart flow indicating various routes for manufacturing a closure according to the present invention.

The gas valve (not represented in the Figures) may be similar in design to the beverage valve (9) with similar resilient means (12) or with an intrinsically biased valve. In one embodiment, the same resilient means apply a compression force to press tight one against the other the two lips of both gas and dispensing valves. In an alternative, embodiment, the closing means, e.g., defined by a score line, can be pierced through or it could be partially delaminated from the planar base (110). Upon retrieval of the gas connecting tube (104), the pressure inside the container presses the delaminated scored portion back against the planar base (110), which can be provided with a sealing lip. The diameter of the gas aperture (15) and associated gas connecting tube (104) is generally smaller than the one of the dispensing aperture (10) and dispensing tube (1), so that for the same force of application of the appliance hood onto the closure, a higher pressure can be applied to the gas valve than to the dispensing valve (9) ($P=F/A$, where P is the applied pressure, F is the force required to click the top section (33) of the appliance into position on the closure (8), and A is the cross sectional area of the gas connection tube (104) or the dispensing tube (1)). Alternative valve designs may therefore be implemented for the gas aperture (15). For example, a shutter may be formed of a resilient material in the interior of the closure shell, obturating the second gas opening (15). The shutter may comprise a folding line on one side, such as a groove, allowing it to be pushed open upon introduction from the outside of the tip of a gas tube (104). Upon retrieval of the gas tube (104) the shutter should have enough resiliency to close back and obturate the gas aperture (15). Since the pressure inside the container is higher than outside, the shutter is pressed tight against the gas aperture (15). An alternative design consists of providing an obturator which is pushed into closed position upon inserting the closure (8) onto the mouth (5) of the container. The obturator shall conserve sufficient resiliency to be pushed back to allow passage of the gas pipe (104) therethrough, thus possibly forming a tight seal around said gas pipe (104). Sealing means are preferably provided upstream of the valve, at the level of the second gas aperture (15). This way, it is possible to introduce a gas pipe (104) into the second gas aperture (15), without necessarily contacting the gas valve. The gas valve can be opened by the flow of pressurized gas into the container by appropriate means, such as providing a funnel shaped passageway for the gas. In all embodiments presented above, the obturating systems of the second gas aperture (15) could be part of, and integrated in the sealing means of the closure One great advantage of the closure of the present invention is that it allows great freedom in the choice of manufacturing techniques used to produce the closures. FIG. 5 illustrates in the form of a flow chart various possible routes for the manufacturing of the present closures. The choice of one among the various routes illustrated in FIG. 5 can be made by a person skilled in the art taking account of parameters such as the design complexity of the closure, cost of the tools, skills of the operators, and so on.

After the closure shell is formed, the valve (9) can be produced separately and positioned into the closure shell. If the valve is intrinsically biased it may be fixed to the closure shell by gluing or welding and the closure is thus completed. If external resilient means (12) are applied, these can be positioned and fixed by gluing, welding or snap fitting or, more preferably, the resilient means can be injection moulded over the positioned valve, thus acting both as resilient means and valve fixing means.

In an alternative embodiment, the valve is injection moulded in situ, directly into the closure shell. Here again, if the valve is intrinsically biased, then the closure is thus completed. If, on the other hand, external resilient means (12) are used, these can be applied separately and fixed by gluing, welding or snap fitting or injected over the valve in an injection over injection (IOI) process.

In yet an alternative embodiment, the valve (9) and resilient means (12) are injection moulded into the shell in one shot by injecting a flexible resilient cellular and ensuring that the density of the cellular material forming the valve (9) is higher than the cellular material forming the resilient means (12). This can be achieved by locally controlling the pressure and temperature in the mould.

For example, the closure of the present invention may be manufactured in a very easy, rapid, and economic way by injection moulding over injection moulding (101) the different components thereof in the same tool, without separate post assembly step being necessary. In a first step (a), the closure shell is injection moulded with a first polymer, such as PP, to form (i) a substantially planar surface (110) defining an inner and an outer surfaces (110in and 110out) and (ii) an outer peripheral skirt (111) jutting out from the circumference of the surface (110) and defining with the inner surface (110in) the "interior" of the closure. The planar surface (110) comprises a first through aperture (10) connecting the inner and outer surfaces (110in and 110out) and may also comprise a second through aperture (15); The peripheral skirt (111) comprises fastening means to ensure a fluid tight mounting onto the mouth (5) of the dispensing container, such as disclosed e.g., in WO2009090224. The closure shell may further include a second inner peripheral skirt (112) jutting out of the inner surface (110in) and enclosing the first through aperture (10) which may be useful for (a) separating the first dispensing through aperture (10) from the second gas through aperture (15), which is particularly advantageous for closures for bag-in-containers, and optionally (b) to confine during injection moulding and support during use the resilient means (12) if any.

Figure 4:
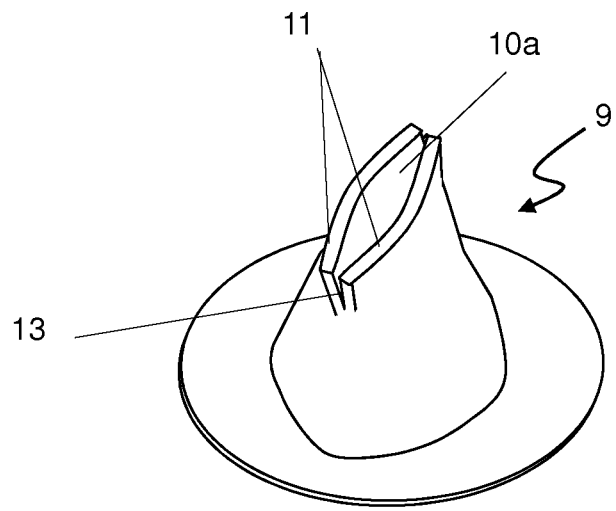
FIG. 4: shows a view of a funnel shaped aperture with lips which can be used in the closure of the present invention.

The valve (9) and resilient means (12) may be produced separately or simultaneously as explained below. In a first embodiment, the flexible valve (9) may either be injected and formed onto the inner surface (110in) of the closure, or a separately produced valve (9) may be positioned on top of the inner surface (110in). In both cases, the flexible valve (9) shall define an interior passageway (210) having a first opening at one end adjacent to and in fluid communication with the first dispensing aperture (10) and having a second opening (10a) at the other end of the passageway. An embodiment of such separately manufactured valve (9) is illustrated in FIG. 4, preferably comprising a peripheral flange allowing to fix it in position upon injection of the resilient means against the inner surface (110in) of the planar surface (110) in communication with the first aperture (10). Various designs of valves suitable for the present invention are described in US2007/0138189 disclosing a vacuum breaker arrangement. As discussed above, it is preferred that the valve comprises a slit (13) at the joints of a pair of lips, running substantially normal to the aperture (10*a*). The valve may be made of any flexible material, such as rubber or flexible thermoplastic or elastomeric thermoplastic materials. It is preferred for recycling reasons, that the valve is made of the same material as or similar to the one used for the resilient means (12) if any and/or sealing means (not shown in the Figures).

A flexible resilient material may then be positioned or injection moulded onto the inner surface (110*in*) of the base (110) and within the peripheral skirt (111) in contact with the flexible valve (9) a flexible resilient material to form resilient means (12) arranged and biased such as to naturally apply a compressive force to press shut and seal the second opening (10*a*). The compressive force applied to the valve second opening (10*a*) should be sufficiently high to ensure fluid tightness of the valve, and sufficiently low as to being suitable to be overcome by introducing the tip (1*a*) of a hollow dispensing tube (1) through the first aperture (10) down said interior passageway (210), and out of said second opening (10*a*) to reversibly open the valve. By "reversibly open" the valve it is meant that upon retrieval of the hollow tube (1) the compressive force applied by the resilient means (12) should be sufficient to shut tight the second opening (10*a*) of the valve (9). The resilient means may be a foam, filling the closure inner space confined in the peripheral (111) or inner skirt (112). The foam should, however, be shaped such as to apply opposing compressive forces on the valve lips (11) and not a hydrostatic pressure which would not shut efficiently the lips. A foam material suitable for the resilient means (12) is Santoprene TPV 271-55 (a combination of PP+EPDM+oil) with a foaming agent, such as Hydrocerol.

Alternatively, or additionally, the resilient means (12) may be made of an elastomeric material, thermoplastic or cross-linked (e.g., rubber). For example, the elastomeric material may be injection moulded in the shape of opposing buttresses abutting against the two lips (11) of the valve second opening (10*a*). The introduction of a dispensing duct (1) through the internal passageway (210) compresses and strains the buttresses, thus reversibly opening the valve at the second end (10*a*). In another embodiment, the resilient means can be made of a thermoplastic material, preferably the same polymer as the closure shell, such as PE or PP. It is preferably in the shape of two opposing curved spring blades, their ends resting on the wall of the inner (112) or peripheral skirt (111) and bowing at their centre such as to contact and be separated by the two lips (11) of the valve second opening (10*a*).

In a second embodiment, the valve is formed together with the resilient means, by a single injection of polymeric material comprising a foaming agent. It was observed that the foam density being higher at the surfaces contacting the tool walls and in restricted or narrow regions of the mould than in the bulk of the foam, it was possible to form with a single injection of a single expanding material the valve (9) and resilient means (12), the valve (9) having two lips (11) and a passageway (210) with walls of density higher than the density of the bulk forming the resilient means (12). In this configuration the resilient means (12) are separated from the valve by an interphase rather than an interface, wherein the density of the foam progressively increases. This embodiment is particularly advantageous in terms of production rate, production cost, and recyclability of the closure over any other closure comprising a resilient valve for gas driven dispensing containers on the market. This cheap solution is particularly suitable for home appliances as the cost ratio between container (complete with valve and pressure regulator) and beverage generally increases with decreasing capacity of the container.

The sealing means (not shown in the Figures) are also injection moulded directly into the closure shell. They preferably are made of the same material as the valve (9) and/or the resilient means, but preferably without foaming agent. In the embodiment where the valve (9) is made separately from the resilient means, the sealing means may be injected into the closure shell together with the valve (9) as it is being injected directly onto the inner surface (110) of the closure or into a neighbouring cavity in the same tool before being positioned onto said inner surface. In the embodiment where the valve and resilient means are injection moulded in one single injection shot, the injection may further include the sealing means, rendering the present embodiment the most cost effective in terms of production rate and cost.

In case the closure comprises a second, gas through aperture (15), it may also be provided with a resilient valve biased to naturally close tight upon retrieval of the pressurized gas duct (104) from the second aperture (15). As discussed above this feature is mandatory in pressurized containers wherein the pressurized gas contact the liquid as illustrated e.g., in FIG. 1(*a*), and may be advantageous for closures for bag-in-containers. If the gas valve is similar in design to the dispensing valve (9), it may be manufactured as explained above in relation with the dispensing valve (9). If an alternative design is used, it is most advantageously injected together with the sealing means, of which it may be an integral part.

The present invention offers the consumer a great degree of freedom in the use of a pressure driven dispensing container used with a dispensing appliance, as it allows the removal of the container from the appliance before the container is empty while avoiding spillage and maintaining the remaining liquid protected from any contact with the atmosphere. This allows the owner of a single dispensing appliance to start several containers in parallel without having to wait until the first is empty before opening the next one, and to still preserve the content of each container unaltered and sealed from ambient.

The invention claimed is:

1. A closure for closing an aperture of a pressure driven dispensing container, said closure comprising:
   (a) an outer shell comprising:
      (i) a substantially planar base, having a thickness, comprising an outer first main surface, and an inner second main surface, said inner second main surface has a periphery and is separated from the outer first main surface by said thickness of the base, said base further comprising a first dispensing aperture fluidly connecting the outer first main surface to the inner second main surface and suitable for receiving a dispensing tube;
      (ii) an outer peripheral skirt projecting down from the periphery of the inner second main surface in a direction opposite the outer first main surface and suitable for sealingly fixing a closure to an aperture of said pressure driven dispensing container;
      (iii) an inner skirt projecting down from the inner second main surface in a direction opposite the outer first main surface, and circumscribed within the outer skirt and enclosing the dispensing aperture; and
   (b) a flexible valve including an upper periphery valve flange, said valve flange in contact with the inner second main surface, said flexible valve located within the inner skirt, and defining an interior passageway having a first opening at one end adjacent to and in fluid communication with the first dispensing aperture and having a second opening at the other end of the passageway, wherein the internal passageway has a funnel shaped geometry, with the first opening located on a wide end of said funnel and being of size matching the size of the closure's first aperture, and the second opening is located on an opposite, narrow end, and wherein the flexible valve is resiliently biased by means of an external resilient foam material disposed completely within the inner skirt and substantially filling a volume defined between the inner second main surface, an inner wall of the inner skirt, and an outer surface of the flexible valve, whereby the external resilient foam material applies a compressive force onto the flexible valve to press shut and seal the second opening and such that said sealed second opening is reversibly openable by pressing a tip of the hollow dispensing tube through the first aperture down said interior passageway and out of said second opening, wherein the valve second opening comprises one or more pairs of lips extending down from the valve flange, said one or more pairs of lips are naturally pressed one against the other by said resilient bias, and which are reversibly separated from one another by introduction there between of the tip of the dispensing tube.

2. The closure according to claim 1, wherein the lips and resilient material are made of a different cellular material, and a density of the lips is higher than a density of the resilient material.

3. The closure according to claim 2, wherein the resilient foam material is a member selected from the group consisting of a thermal conductor, electrical conductor, and mixtures thereof.

4. The closure according to claim 3, wherein the interior passageway of the valve is a funnel-shaped opening on the lips at the narrow end of the funnel.

5. The closure according to claim 4, wherein the resilient bias of the valve is locally higher on one side of the valve than on the other side of the valve, so that the free end of the valve bends over towards the other end and further restricts the passageway and enhances the tightness of the valve.

6. The closure according to claim 5, wherein a membrane seals the first dispensing aperture, said membrane being either easily breakable by pressing thereto the tip of a dispensing tube or easily removable.

7. The closure according to claim 1, comprising a second gas aperture fluidly connecting the outer first main surface to the inner second main surface, located between the inner skirt and the peripheral skirt, and suitable for receiving a hollow gas tube.

8. The closure according to claim 7, wherein the second gas aperture comprises a closure that (a) is opened by pressing therethrough the tip of a hollow pressurized gas tube and (b) is resiliently and sealingly closed as the tip of the gas tube is retrieved.

9. The closure according to claim 8 suitable for closing a bag-in-container with a sealer separating the gas aperture from the dispensing aperture.

10. A pressure driven dispensing container comprising a mouth for dispensing a liquid and including a closure according to claim 1, sealingly inserted in the mouth, with an inner surface of the peripheral skirt contacting an outer surface of the container and with an outer surface of the inner skirt contacting an inner surface of the container.

11. The pressure driven dispensing container according to claim 10, which is a bag-in-container.

12. The closure according to claim 1, wherein the resilient bias of the flexible valve is obtained by an external resilient material arranged such as to apply a compressive force to press shut and seal the second opening, said resilient material is a foam.

13. The closure according to claim 1, wherein the lips and resilient material are made of a same cellular material, and a density of the lips is higher than a density of the resilient material.

14. The closure according to claim 1, wherein the resilient material is a member selected from the group consisting of a thermal conductor, electrical conductor, and mixtures thereof.

15. The closure according to claim 7 suitable for closing a bag-in-container with a sealer separating the gas aperture from the dispensing aperture.

16. The closure according to claim 1, wherein each pair of lips comprises a slit at the joining points of the lips.

* * * * *